(12) United States Patent
Gray, Jr.

(10) Patent No.: US 6,651,432 B1
(45) Date of Patent: Nov. 25, 2003

(54) CONTROLLED TEMPERATURE COMBUSTION ENGINE

(75) Inventor: Charles L. Gray, Jr., Pinckney, MI (US)

(73) Assignee: The United States of America as represented by the Administrator of the Environmental Protection Agency, Washington, DC (US)

( * ) Notice: Subject to any disclaimer, the term of this patent is extended or adjusted under 35 U.S.C. 154(b) by 0 days.

(21) Appl. No.: 10/214,229

(22) Filed: Aug. 8, 2002

(51) Int. Cl.[7] ............................................. F02B 33/44
(52) U.S. Cl. ..................... 60/605.2; 60/602; 60/280; 123/435; 123/305; 123/564
(58) Field of Search ....................... 123/564, 559.1, 123/676, 295, 305, 435; 60/600–603, 605.2, 280, 285

(56) References Cited

U.S. PATENT DOCUMENTS

| | | | |
|---|---|---|---|
| 4,612,770 A | * | 9/1986 | Tadokoro et al. ............ 60/602 |
| 5,778,857 A | * | 7/1998 | Nakamura et al. .......... 123/435 |
| 6,209,515 B1 | * | 4/2001 | Gotoh et al. ................ 123/305 |
| 6,230,683 B1 | * | 5/2001 | zur Loye et al. ........... 123/435 |
| 6,276,139 B1 | * | 8/2001 | Moraal et al. ............. 60/605.2 |
| 6,276,334 B1 | * | 8/2001 | Flynn et al. ................ 123/435 |
| 6,279,550 B1 | * | 8/2001 | Bryant ..................... 123/559.1 |
| 6,286,482 B1 | * | 9/2001 | Flynn et al. ................ 123/435 |
| 6,295,816 B1 | * | 10/2001 | Gallagher et al. ......... 123/564 |
| 6,325,054 B1 | * | 12/2001 | Wenger et al. ............... 60/280 |
| 6,516,774 B2 | * | 2/2003 | zur Loye et al. ........... 123/305 |

* cited by examiner

Primary Examiner—Thomas Denion
Assistant Examiner—Thai-Ba Trieu
(74) Attorney, Agent, or Firm—Lorusso, Kelly & Loud (57) ABSTRACT

A method of operating an internal combustion engine wherein intake ambient air is boosted to a higher pressure by passage through at least one compressor and then introduced into the internal combustion engine. Fuel is also introduced into the internal combustion engine for providing combustion in admixture with the air charge at a combustion temperature approximating a target value. Various engine operating parameters, inclusive of torque demand, e.g., accelerator pedal depression, are sensed and the boosted pressure is changed in a manner proportional to a change in the sensed torque demand so as to maintain the combustion temperature at approximately the target value, i.e., below 2100° K.

28 Claims, 3 Drawing Sheets

CONTROLLED TEMPERATURE COMBUSTION ENGINE

BACKGROUND OF THE INVENTION

1. Field of the Invention

The invention is directed to a reduction of $NO_x$ and PM emissions from combustion engines. The field of application is primarily in internal combustion engines for motor vehicles, but this invention can also be utilized in other energy conversion "engines" which utilize combustion of chemical fuels, including electric power generation plants.

2. The Prior Art

The growing use of motor vehicles greatly adds to the atmospheric presence of pollutants, such as oxides of nitrogen and particulate matter, and has created a demand for a significant reduction in such emissions.

Prior art gasoline engines generally operate with charge-air throttling and intake port fuel injection to provide a mixture of fuel and charge-air for inducting into the combustion chambers. The term "charge-air" as used herein means either air or a mixture of air and recirculated exhaust gas. Charge-air throttling is used to control the load (or torque) output of the engine and results in significant efficiency penalties, especially at lower loads. Port fuel injection is used to provide good control and mixing of the required fuel with charge-air. Pre-mixed fuel and charge-air will auto-ignite during compression, depending on the fuel and charge-air characteristics, at a certain compression ratio which corresponds to the auto-ignition temperature of the fuel and charge-air mixture. Prior art gasoline engines are generally limited to compression ratios of between 9:1 and 10:1 to avoid uncontrolled auto-ignition. The ignition process is initiated by the sparking of a spark-plug so that rapid combustion begins at or near piston top dead center TDC, (generally between TDC and 20 crank angle degrees after TDC), and combustion propagation proceeds from the ignition location as a "flame-front" traveling through the combustible mixture. At higher compression ratios and some operating conditions, the fuel and charge-air mixture auto-ignites in an uncontrolled manner and exhibits unacceptable "knock." Not being able to safely operate at higher compression ratios significantly reduces the engine's efficiency potential.

some gasoline engines utilize direct fuel injection (fuel is injectec directly into the combustion chanber), with or without charge-air throttling. Generally, these engines operateat low loads throgh stratified combustion. The fuel is injected relatively late in the compression stroke with little or no charge-air throttling. A spark then initiates combustion that can occur as long as the stratified mixture is within the flamability limits of the fuel. Since the late injection allows less time for good fuel and charge-air mixing than pre-mix operation, such combustion is characterized by higher unburned fuel and particulate emissions. Also, localized temperatures are high and NO is formed and becomes part of the exhaust emissions. At higher loads the beginning of the fuel injection occurs earlier to allow more time for fuel and charge-air mixing. The earlier fuel injection limits the compression ratio for gasoline to levels comparable to the pre-mixed engines since in effect they become pre-mixed engines at high loads. Pre-mixed gasoline engines also experience high combustion temperatures and produce significant NO emissions.

Prior art diesel engines operate over all loads with late direct fuel injection and with little or no charge-air throttling. Diesel engines also operate at a relatively high compression ratio (generally between 15 and 20 to one) as compared to prior art gasoline engines because they make use of the auto-ignition properties of diesel fuel. Diesel fuel will under all intended operating conditions auto-ignite when injected into the compressed charge-air at or near TDC. As a result of these operating characteristics, diesel engines exhibit high efficiency. The primary problems with diesel engines are the unburned fuel, particulate and $NO_x$ emissions, as previously explained for late direct injection of gasoline. Gasoline could be used in prior art diesel engines by adding an assured source of ignition (e.g., a spark or glow plug), but still with the same emission problems.

SUMMARY OF THE INVENTION

Accordingly, it is an object of the present invention to provide for both efficient engine operation and extremely low levels of $NO_x$ emissions.

It is another object of the present invention to provide a method of engine operation wherein compression temperature and peak combustion temperature are controlled over an engine's speed and load range.

Accordingly, the present invention provides a method of operation of an internal combustion engine including intaking ambient air through at least one compressor to provide a charge-air at a boosted pressure and introducing the boosted charge-air to the internal combustion engine. The method further includes introducing fuel into the internal combustion engine for combustion in admixture with the charge-air at a combustion temperature approximating a target value, producing an exhaust gas. Engine operating conditions, inclusive of torque demand, are sensed and the boosted pressure is changed proportional to a change in the sensed torque demand so as to maintain the combustion temperature at approximately the target value, which value is below 2100° K.

In a preferred embodiment the method further involves passing a portion of the charge-air through a heat exchanger with bypass of the heat exchanger by a second portion of the charge-air. The temperature of the charge-air is sensed downstream of the bypass line and heat exchanger and the amount of the second portion bypassing the heat exchanger is controlled by operation of a control valve in the bypass line to bring the sensed intake temperature to a target temperature determined in accordance with the sensed engine operating conditions.

A portion of the exhaust gas may be recirculated for admixture with the charge-air and fuel. In this case, oxygen concentration in the admixture is sensed and the amount of EGR is regulated to bring the sensed oxygen concentration to a target oxygen concentration determined for the sensed engine operating conditions. The fuel feed is controlled responsive to the sensed temperature of the charge-air intake and the sensed boost pressure.

The fuel may be introduced into the charge-air downstream or upstream of the compressor so that the fuel is contained within the charge-air.

Thus, the present invention provides, in an internal combustion engine, high compression ratio (e.g., generally greater than 15 to 1 in the compression stroke) operation with little or no charge-air throttling, as is characteristic of the high-efficiency diesel-cycle engine, but without the emission problems of prior art engines, through a unique, new method of operation.

The formation rate of the pollutant NO during the fuel combustion process can be generally expressed in simplified form as follows:

$$\text{NO formation rate} = C_1[N_2]^{C_2}[O_2]^{C_3} \exp^{C_4 T} \qquad (I)$$

Where: $C_1$, $C_2$, $C_3$, and $C_4$ ($C_x$) are constants, [$N_2$] is the concentration of nitrogen, [$O_2$] is the concentration of oxygen, exp is a constant, and T is the absolute temperature of the mixture.

Figure 1:
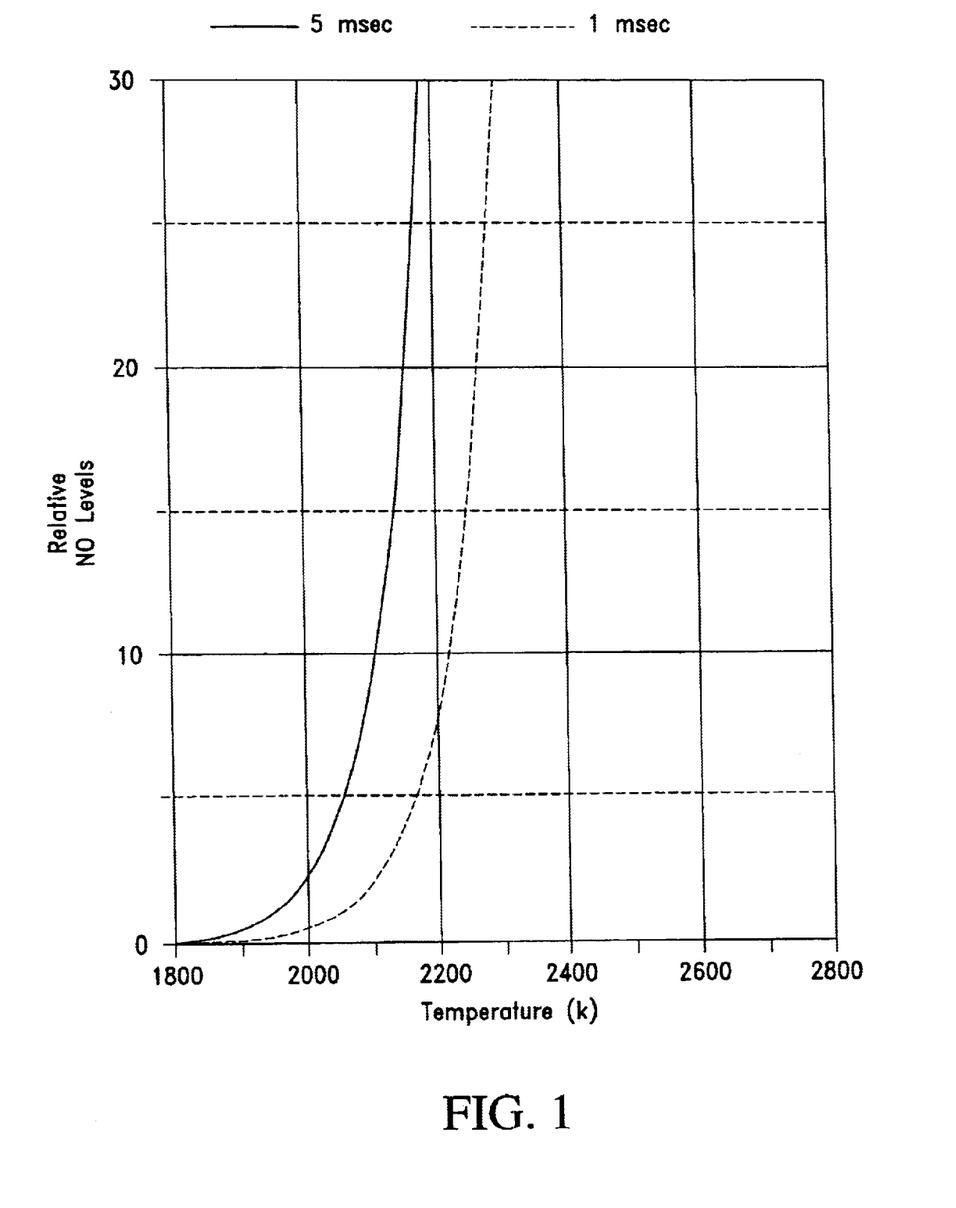
FIG. 1 is a graph of NO emission levels versus engine combustion temperature in degrees Kelvin.

Since temperature is an exponent in the above formula (I), it can be expected that for given concentrations of nitrogen and oxygen, the NO formation rate increases exponentially with temperature. This relationship is widely recognized and is shown graphically in FIG. 1 for typical engine operating conditions. Engine combustion times general fall within one to five milliseconds. It can clearly be seen that the formation of NO will be minimal if the engine combustion temperature can be maintained below about 2000 degrees Kelvin(K). The desirability of maintaining combustion temperatures below this level and yet still have combustion rapid enough to be complete for practical engine speeds, is well known. A recent Society of Automotive Engineers Technical Paper (#2000-01-1177) by Patrick F. Flynn and others from Cummins Engine Company reflects prior art understanding of the known methods of operation of engines with the goal of controlling combustion temperature to reduce formation of NO. This paper concludes that, for gasoline and other spark-ignition engines, "the minimum possible peak combustion temperature is 2100 K" and "$NO_x$ numbers show a limit of 0.5 g/bhp-hr," and that, for diesel engines, "the lowest possible peak combustion temperature would be approximately 2300 K" with a "$NO_x$ emissions level of 1.0 g/bhp-hr."

The present invention provides a new method of engine operation that yields stable and efficient combustion at temperatures below 2100 K. Results for $NO_x$ emissions with gasoline, diesel and other fuels are consistently less than 0.2 g/bhp-hr, substantially below that for prior art engines.

Referring again to the Equation I for NO formation rate, the oxygen concentration must be sufficient to fully react with the available fuel for a given engine operating condition, e.g., charge-air boost level. The nitrogen concentration is naturally high in the charge-air and, therefore, temperature is the one variable available for control to limit NO formation, once the oxygen concentration is minimized and optimized for the operating condition. It is also critical to control local temperature as NO is rapidly formed wherever the temperature is above 2000 K.

In control of the peak temperature of combustion by the method of the present invention two factors are most important. First, the temperature, $T_1$, of the charge-air, or the charge-air fuel mixture if fuel is pre-mixed, at the beginning of compression, must be controlled. Generally, the objective is to minimize $T_1$, since the compression process is a multiplier of $T_1$ (in degress absolute). For an ideal gas, the final compression temperature, $T_2$, is a function of the compression ratio, CR, assuming adiabatic compression, i.e., $T_2=T_1$ f(CR) (where f(CR) is a function of CR). For example, for a compression ratio of 16, the multiplier of $T_1$ is about 3. Therefore, if the $T_1$, were 300° Kelvin (27° Celsius), $T_2$ would be 900 K. However, if $T_1$ were 400° Kelvin (127° Celsius), $T_2$ would be 1200 K.

Second, for a given quantity of fuel to be burned, assuming adiabatic combustion, the final combustion temperature, $T_3$ can be calculated as follows: $T_3=T_2+H_c/C_v$ (where $H_c$=heat released from combustion of the fuel and $C_v$ is the total heat capacity of the charge-air fuel mixture, i.e., the mass of the mixture times the specific heat capacity). Since for a given quantity of fuel burned, $H_c$ is fixed, the only variable available for control of $T_3$ is $C_v$. If $C_v$ is large, $T_3$ will be lower. The quantity of fuel burned, in turn, is a function of (proportional to) torque demand.

The present invention controls $T_3$, for example to 2000° Kelvin (see FIG. 1), to minimize NO formation. Therefore, for a constant $T_2$, $H_c/C_v$ must be maintained constant. To maintain $H_c/C_v$ constant, $C_v$ must increase as the quantity of fuel combusted (engine load) is increased. Since $C_v$ is of the form $C_v=c_vM$ (where $c_v$ is the specific heat capacity of the charge-air fuel mixture and M is the mass of the charge-air fuel mixture), M must be increased as the quantity of fuel combusted is increased and decreased as the quantity of fuel combusted is decreased. This is accomplished in the present invention by controlling the boost pressure of the charge-air in the intake system, i.e., controlling the charge-air density. The mass M is proportional to the pressure of the charge-air.

Another important factor to consider and account for is the fact that a real engine is not adiabatic. If the temperature of the charge-air as it enters the intake system is $T_o$, and is at a temperature lower than portions of the intake system, heat will flow from the intake system into the charge-air and its temperature will rise. Also, as the charge-air is inducted past the intake valve(s) into the engine cylinder, it will be exposed to the hot surfaces of the cylinder head, piston top and cylinder walls, surfaces that were just prior exposed to the combustion process and the hot (e.g., 2000° at the end of combustion) combustion gases during the period of expansion and exhaust strokes (for a four-stroke engine). Therefore, heat will flow into the charge-air during the intake stroke and early portions of the compression stroke. To control (usually minimize) the rise in temperature of the charge-air prior to the compression temperature rise, the method of operation of the present invention primarily utilizes control of the boost pressure. As the boost pressure controls the mass of charge-air (or if fuel is present, the charge-air/fuel mixture, both also referred to herein as "charge mass" or simply "charge"), it directly controls the temperature rise of the charge mass since, for a given heat energy flow into the charge mass from the system surfaces, the temperature rise is directly proportional to the mass of the charge, as shown by the relationship: $T_1=T_0+H_w/C_v$, where $H_w$ is the heat energy from the system surfaces. $C_v$ is increased to reduce $T_1$ by increasing charge mass as previously shown.

The method of operation of the first and second embodiments of the present invention controls $T_2$ to assure that auto-ignition and combustion are sufficiently rapid to be efficient and effective over the operating speed and load of practical engines (generally combustion that is 90% complete within 1 to 5 milliseconds), and controls $T_3$ to assure minimal NO formation. Controlling $T_3$ to the levels of the present invention also improves engine efficiency since the lower than prior art $T_3$ levels reduce the heat loss from the combustion gases during expansion. Heat (energy) that flows through the system walls to the engine "coolant" would, if retained in the combustion gases, be used to sustain higher system pressures during expansion and thus extract more useful work for a given quantity of fuel burned. With a lower $T_3$ the temperature difference, ΔT, between the combustion gases and the system surfaces is lower and less heat energy flows to the coolant.

DESCRIPTION OF THE PREFERRED EMBODIMENTS

First Embodiment

Figure 2:
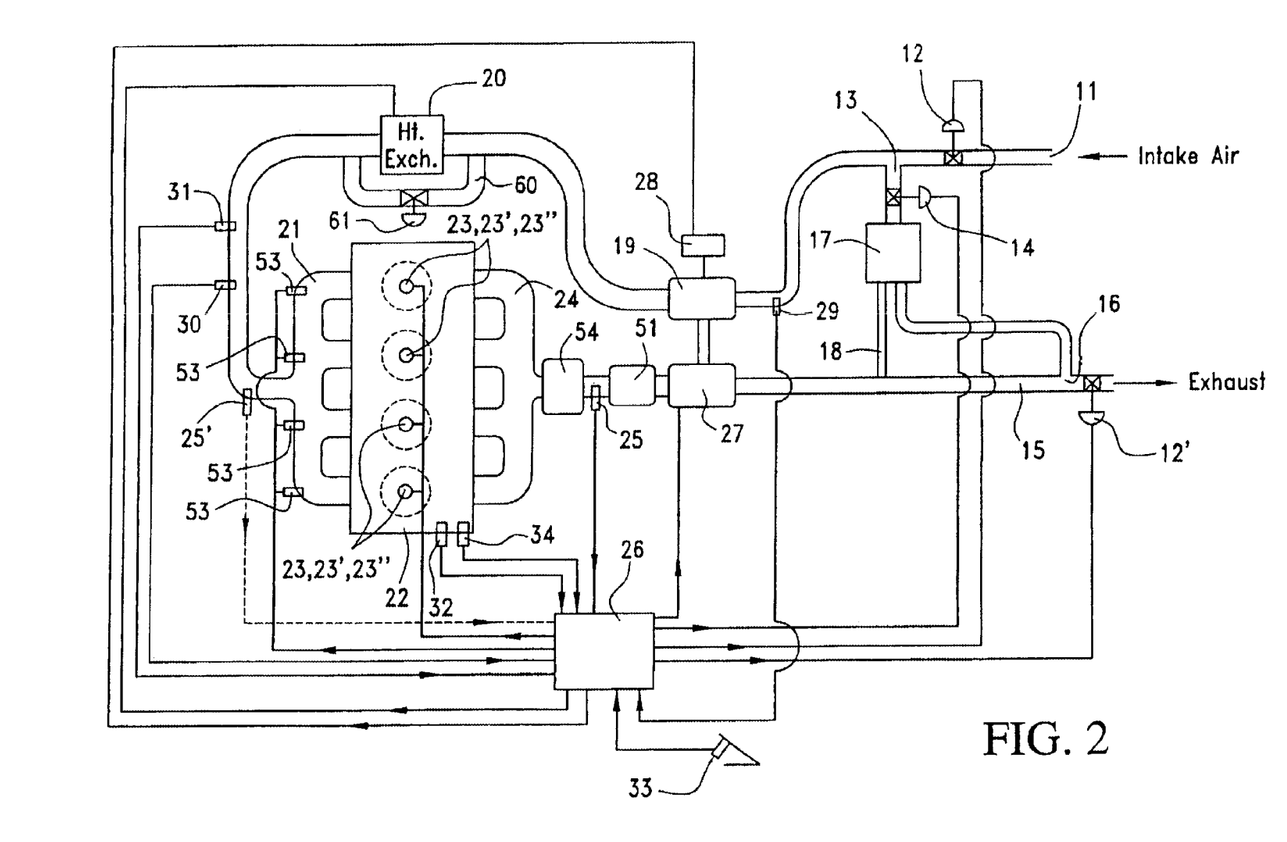
FIG. 2 is a schematic diagram of an engine drivetrain operated in accordance with the method of the present invention.

FIG. 2 illustrates a first embodiment of the invention in a controlled temperature combustion engine 22 operating with a fuel that is characterized by relatively low octane and relatively high cetane, i.e., a fuel with a relatively low auto-ignition temperature like conventional diesel fuel. In the first embodiment (and in all embodiments) the final combustion temperature ($T_3$) is controlled at or below about 2000° K in order to minimize $NO_x$ formation. $T_3$ is controlled by (1) control of boost pressure, (2) control of the final compression temperature ($T_2$), each of which is described in more detail below. The first embodiment operates with a compression ratio conventional for diesel engines, i.e., within a range of about 16:1 to 20:1. Auto-ignition occurs upon injection of fuel. Accordingly, location of auto-ignition is controlled by control of timing of fuel injection, preferably from about 20° BTDC to near TDC to produce peak cylinder pressure from immediately after TDC to near 15° after TDC.

To enable the utilization of a high compression ratio (e.g., greater than 15) for high efficiency, the engine relies on the primary fuel supply through direct cylinder fuel injectors 23. Intake air enters at port 11 and its flow may be throttled by optional valve 12. Exhaust gas is mixed with intake air at port 13 forming the charge-air mixture. Exhaust gas is routed from the exhaust pipe at port 16 through exhaust gas cooler 17, with optional condensate return to exhaust line 18, through optional exhaust gas flow control valve 14, to port 13. The primary exhaust gas recirculation (EGR) control valve 12' is located just downstream of port 16 in the exhaust pipe. By restricting flow through valve 12', the exhaust gas flow rate to port 13 is controlled.

The method of the present invention may utilize maps, established by operation of a particular engine in the manner previously described to achieve a target NO emission level and stored in the controller 26, to specify the optimum boost level and charge-air temperature (together resulting in a desired charge-air mass flow rate), optimum intake charge-air and/or exhaust oxygen concentration(s), and desired fuel rate for each speed and load (torque) over which the engine is specified to operate, to maintain the combustion temperature at the target level below 2100° K e.g., 2000° K.

Control of Boost Pressure

Charge-air flows through and is compressed by compressor 19. Compressor 19 may be a single stage compressor or two or more compressors in parallel or in series and is primarily driven by exhaust gas expander motor 27 to provide a controlled boost pressure level to intake manifold 21. Boost pressure level is determined by boost charge-air pressure sensor 31. Controller 26 sends appropriate signals to expander motor 27 to control boost. An optional electric or hydraulic motor 28 may be used and controlled by controller 26 to provide rapid boost level changes to assist the exhaust expander motor 27 in providing rapid torque response, since torque is dependent on boost level and boost level is controlled for controlled temperature combustion as previously described. Controller 26 therefore sends appropriate signals to the optional electrical or hydraulic motor 28 to control boost level during transients and during any operating conditions where the expander motor 27 alone cannot supply sufficient boost pressure.

Control of Charge-Air Temperature

Compressed charge-air flows through heat exchanger 20 to intake manifold 21. Heat exchanger 20 contains a by-pass line 60 and a by-pass control valve 61 and controller 26 adjusts the control valve 61 to control charge-air temperature ($T_1$). Charge-air temperature $T_1$ is determined by temperature sensor 30 for input to controller 26. Heat exchanger 20 operates as a "cooler" to cool the charge-air (the normal mode in this embodiment) or heat the charge-air as necessary to control charge-air temperature to a desired level. The heat exchange medium used in heat exchanger 20 may be the ambient air, engine coolant, exhaust gas, etc.

Figure 3:
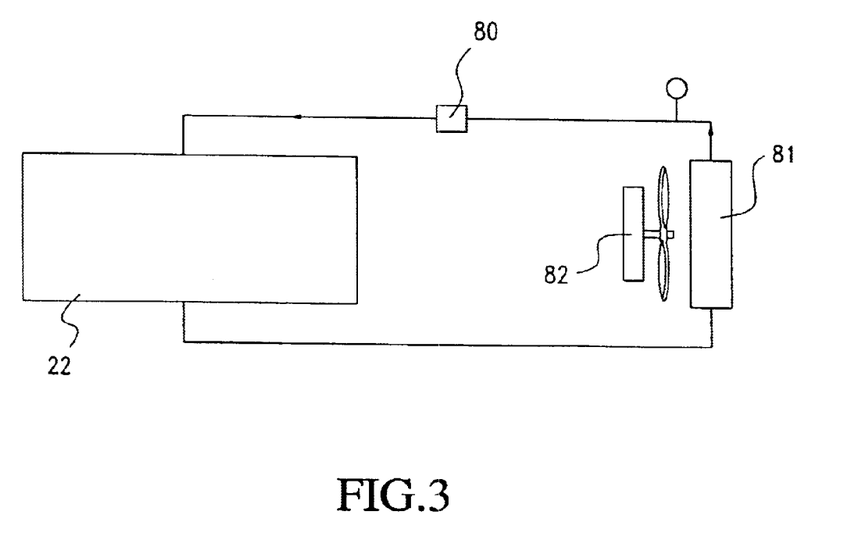
FIG. 3 is a schematic diagram of an engine cooling system which may be utilized in the method of the present invention.

Further, in accordance with the present invention, $T_1$ may also be controlled by controlling the temperatures of the surfaces exposed to the charge mass since heat energy flow occurs according to the relationship: $H_w=(T_s-T_0)W$, where $T_s$ is the temperature of exposed surfaces (which of course varies with location and time), $T_0$ is the temperature of the charge mass at the exposed surface, and W is an overall heat transfer coefficient. Control of $T_s$ is accomplished by control of engine coolant temperature, $T_c$, and coolant flow rate F. F directly controls the heat transfer coefficient from the coolant to the "surface" (assuming a small and fixed temperature difference across the system walls). $T_s$ therefore varies according to the relationship: $T_s=B\ T_cF$, where B is a constant. $T_c$ may be controlled by controlling the degree of external cooling in the coolant heat exchanger (commonly referred to as the radiator), by adjusting the cooling surface area exposed to ambient air flow and/or by controlling the ambient air flow through the coolant heat exchanger, usually, by varying the speed of the "radiator" fan while F may be controlled by an electronically controlled valve in the engine coolant supply or discharge line. $T_c$ is controlled to a coolant supply target temperature provided in a look-up map as a function of engine speed and load. F is also controlled to a target level provided in a look-up map as a function of engine speed and load. FIG. 3 illustrates the cooling system for engine 22. Engine coolant flow rate F to and from engine 22 is controlled by coolant pump 80. Engine coolant temperature Tc is controlled at the exit of radiator 81 by varying the speed of fan 82.

Control of $O_2$ Concentration

Optional port fuel-injectors 53 may be used in conjunction with direct fuel injectors 23 to minimize particulate formation and to rapidly adjust fuel injection levels. Optional oxygen sensor 25' may be used to directly determine the oxygen concentration in the charge-air as a faster control signal than relying on a calculated (or "expected") oxygen intake level based on the exhaust oxygen sensor 25. The oxygen concentration signals are used in control of EGR, i.e., valve 12'. Alternatively, charge-air oxygen concentration may be determined from the exhaust oxygen concentration, fuel-injected quantity, and the charge-air boost level and temperature. Optional charge-air mass flow sensor 29 may also be used to provide faster and more accurate engine control, i.e., in control of engine fuel feed rate which determines engine torque output, and may be used as an indirect sensor in determination (i.e., calculation) of intake charge-air oxygen concentration. Charge-air enters the combustion chamber (not shown) through conventional valves (not shown) in a conventional manner and exhaust gases leave the combustion chamber through conventional valves (not shown) and leave engine 22 through exhaust manifold 24. Exhaust particulate trap oxidizer 54 removes any particulate emissions and catalyst 51 oxidizes residual fuel and carbon monoxide. Engine speed is provided to controller 26 by speed sensor 32. Torque command level is provided to controller 26 by accelerator pedal sensor 33.

For a low auto-ignition temperature fuel like conventional diesel fuel, exhaust gas recirculation (EGR) is used primarily to disperse the combustion heat-release (i.e., insure fuel molecules uniformly mix with the charge-air to access oxygen molecules and thus spread the combustion heat release uniformly through the charge-air mass). Since the heat capacity of EGR is similar to air, its use with such fuel is primarily to avoid localized temperatures above the NO formation threshold (e.g., 2000° K). Thus, the inlet charge-air oxygen concentration must be controlled (considering boost level and inlet charge-air temperature, i.e., mass charge-air flow rate) to insure that the fuel molecules will disperse throughout the charge-air mass to access oxygen molecules for combustion. Valve 12' operates to regulate EGR responsive to these sensed oxygen concentrations.

However, allowing some excess oxygen for a given fuel level will minimize particulate formation due to poor combustion. For a particular operating condition, a particular exhaust oxygen concentration will also result. For example, for an engine targeting less than 0.2 grams/brake horsepower $NO_x$ emissions, concentration values of intake charge-air oxygen less than twelve to fourteen percent, and exhaust oxygen concentrations of less than six percent work well for a fuel similar to conventional diesel fuel. For a given fuel, there is an oxygen concentration level in the charge-air (e.g., about twelve percent for conventional diesel fuel) that corresponds to sufficient charge-air mass to constrain (by absorbing heat energy) the temperature rise associated with the combustion heat release, when utilizing the available oxygen mass to reduce the oxygen concentration to a specified target level (e.g., about six percent for conventional diesel fuel), to a peak combustion temperature below the NO formation threshold. For this example, about 50% of the charge-air oxygen mass was utilized in the combustion reaction. With such constraints, the only way to increase torque output (i.e., combust more fuel) is to increase the charge-air mass as previously described.

Therefore, for all fuel molecules to "find" sufficient oxygen molecules within the very short time available (e.g., generally less than 5 milliseconds), the engine combustion system (combustion chamber, charge-air motion and fuel injector) must be optimally configured. Fuel and oxygen molecules must "get together" while the system temperature is still above the rapid auto-ignition temperature of the fuel for good combustion to occur. Fortunately, the rapid autoignition temperature for most fuels of this embodiment are significantly lower (e.g., less than 1000° K) than the temperature threshold for NO formation (i.e., 2000° K). Auto-ignition occurs rapidly at the controlled operating temperature, but the combustion rate is determined by the rate that fuel molecules mix with the charge-air and access oxygen molecules.

For open loop operation, controller 26 reads torque command from pedal sensor 33 and actual engine speed from speed sensor 32. For an increased torque command, controller 26 commands expander motor 27 and, if needed, compressor motor 28 to increase boost pressure level to the new target from stored maps associated with the commanded torque at the measured engine speed. Controller 26 commands heat exchanger 20 by-pass control valve 61 position from stored maps to target the desired intake charge-air temperature for the engine operating condition. Controller 26 commands EGR valve 12' to the position from stored maps appropriate to achieve the desired intake charge-air and exhaust oxygen concentrations. The controller 26 reads actual boost level from sensor 31 and actual intake charge-air temperature from sensor 30 and from stored maps commands the appropriate fuel rate.

For more accurate engine control, closed-loop control loops may be utilized. Exhaust oxygen concentration may be read from sensor 25 and, optionally, intake charge-air oxygen concentration may be read from sensor 25', with controller 26 comparing actual oxygen concentration to the desired level for the actual operating point (from stored maps) and commanding the EGR valve to adjust to achieve the target oxygen concentration. Actual boost level from sensor 31 may be compared by controller 26 to the desired level from stored maps and motors 27 and 28 adjusted as appropriate to achieve the target boost level. In like manner, actual intake charge-air temperature from sensor 30 may be compared by controller 26 to the desired temperature from stored maps and cooler 20 by-pass control valve 61 adjusted as appropriate to achieve the target charge-air temperature. Fuel flow rate may also be adjusted based on the actual readings to achieve the target fuel rate.

Second Embodiment

Again with reference to FIG. 2, a second embodiment of the invention will now be described. In this second embodiment a controlled temperature combustion engine 22 operates at diesel-like efficiency with a fuel that is characterized by relatively high octane and relatively low cetane, i.e., a fuel with a relatively high auto-ignition temperature like conventional gasoline fuel. Although operated with conventional gasoline fuels, this embodiment, unlike conventional gasoline engines, uses a high compression ratio, generally in the range of 12 to 19.5:1, preferably at least 14:1 and more preferably at least 16:1. This embodiment is further characterized by mixing fuel and charge-air before auto-ignition (generally with mixing occurring before the last 30 crank angle degrees before compression TDC), with a goal of homogeneous combustion, i.e., utilization of a pre-mixed charge of fuel and charge-air.

This second embodiment, as in the other embodiments, utilizes a unique control scheme by which $T_3$ is controlled for minimum $NO_x$ by (1) control of boost pressure and (2) control of $T_2$. This second embodiment, like the first embodiment described above, operates with autoignition but differs from the first embodiment in that the location of the combustion event, i.e., timing of the auto-ignition, is controlled, not by timing of the fuel injection, but by control of (in addition to boost pressure and $T_2$) intake charge-air oxygen concentration to individually control the location of peak cylinder pressure for each cylinder. This second embodiment also differs from the first embodiment in that it has more precise control of oxygen concentration and of $T_2$.

Control of Charge-Air Oxygen Concentration

Because of the pre-mixed nature of the fuel and charge-air before ignition, utilizing EGR to reduce the intake charge-air oxygen concentration is not necessary to disperse the heat release of combustion throughout the mixture as in the first embodiment, since the fuel and charge-air are already well mixed. However, EGR is used with this embodiment as will be discussed in more detail later to control the concentration of charge-air oxygen to assist in initiating auto-ignition and to control the location of the peak combustion cylinder pressure to within an optimum range of from immediately after TDC to near fifteen crank angle degrees after TDC. The control of $T_3$ (peak combustion temperature) to limit the formation of NO is otherwise the same as was previously described.

Since controlling combustion temperature, $T_3$, inherently includes controlling the final compression temperature, $T_2$, also as previously described, the method of operation of this second embodiment of the present invention also provides for controlled homogeneous charge compression ignition (HCCI). This homogeneous charge auto-ignition engine of the present invention provides high efficiency (high compression and expansion ratios and little or no charge-air throttling as described earlier), low $NO_x$ emissions (by controlling combustion temperature as described earlier) and low particulate emissions (due primarily to the ability to provide a homogeneous fuel and charge-air mixture before auto-ignition and combustion).

Referring again to FIG. 2, with the method of operation of the present invention, fuels like conventional gasoline can operate over a wide range of speed and load at a high compression ratio (e.g., greater than 14 at relatively low boost levels, generally below two bar pressure, and even greater than 19 at relatively modest boost levels, generally below three bar pressure) to attain "diesel-like" efficiencies even while relying on the primary fuel supply through the port fuel injectors 53. Operation according to this second embodiment is identical to that presented for the first embodiment except for the distinctions described here. The optional direct fuel injectors 23 may be used for certain high power modes when utilizing higher compression ratios (e.g., greater than 18), but the likely increase in particulate emissions and greater reliance on trap oxidizer 54 makes the utilization of these injectors unattractive. Heat exchanger 20 is more likely to operate in the charge-air heating mode (as previously described) than in the first embodiment, with heat additions from exhaust gas more likely with light loads of low compression ratio engine configurations.

Control of $T_2$

The method of operation of the second embodiment is distinguished from the first embodiment further by the need to more precisely control $T_2$ (final compression temperature) and charge-air oxygen concentration, as just discussed, to insure auto-ignition and control the location of peak combustion cylinder pressure (or the rate of combustion cylinder pressure rise or the level of the peak combustion cylinder pressure). The initiation of auto-ignition and rapid combustion is generally described as follows:

$$\text{Combustion initiation and combustion rate} = C_5[HC]^{C_6}[O_2]^{C_7}\exp^{C_8 T}$$

Where: $C_x$ are constants, [HC] is the concentration of the fuel, $[O_2]$ is the concentration of oxygen, exp is a constant, and T is the absolute temperature of the mixture.

Like the formation reaction for NO previously described, fuel combustion initiation and reaction rate are strongly influenced by the final compression temperature, $T_2$. In this case, controlling the initiation and rate of combustion is also strongly influenced by the concentration of oxygen, since at a given engine load level, the fuel concentration is fixed. For example, the engine maps established and stored in controller 26 as previously described, for a low compression ratio configuration of the embodiment (e.g.,14) operating at light load, may choose to utilize a lower $T_2$ with a higher oxygen concentration to minimize system cost. At higher compression ratios (e.g., 18) and high load, controlling the initiation of auto-ignition and the location of the peak cylinder combustion pressure, requires maps which strive to minimize $T_2$, since reducing oxygen concentration will require higher boost levels at a higher cost.

The description of the closed loop operation as previously described for the first embodiment also applies to this second embodiment, but one important enhancement is replacement of direct fuel injectors 23 (FIG. 2) with sensors 23' which sense the cylinder pressure rise associated with combustion. Sensors 23' are used in conjunction with conventional crank angle position sensor 34 to determine the crank angle position where auto-ignition or preferred peak cylinder combustion pressure occurs. Sensors 23' may be direct cylinder pressure sensors or may determine cylinder pressure through indirect means, e.g., knock sensors or load sensors. Sensors 23' provide input to controller 26 for establishing a closed loop signal to adjust one of the previously described parameters that determine said position to achieve the optimum position as determined by controller 26 from stored maps.

Thus, in the second embodiment location of the combustion event, i.e., location of peak cylinder pressure, results from the final compression charge-air temperature $T_2$ and the oxygen concentration in the charge-air to the intake manifold. Controller 26 determines the optimum crank angle for the location of the combustion event, for a given load and speed of the engine, from a map stored in memory and adjusts $T_2$ and/or oxygen concentration to levels determined from maps stored in memory. The controller 26 controls oxygen concentration in the charge-air to the intake manifold in the manner previously described in connection with the first embodiment, i.e., by operation of valves 14 and 12' and by control of the boost level. Controller 26 may, in the alternative or additionally, control $T_2$ through control of $T_1$ by adjustment of the bypass control valve 61 in the bypass line 60 around heat exchanger 20. Signals from sensors 23' enable closed loop control of the location of the combustion event by input to the controller 26 of a signal representing the actual, detected crank angle location of the combustion event. Responsive to said signal, the controller 26 adjusts $T_2$ and/or oxygen concentration in the charge-air in order to bring the actual crank angle location at which peak combustion pressure occurs to coincide with the target value for crank angle location at which the peak combustion cylinder pressure should occur, by means of adjustment of $T_1$ (and $T_2$) and/or by means of adjustment of oxygen concentration in the charge-air as previously described.

As in the first embodiment $T_1$ may also be controlled by controlling the temperatures of engine surfaces contacting the charge-air in the manner previously described.

Of course, $T_2$ is also dependent upon $T_3$ and the second embodiment may be combined with control of $T_3$ as described for the first embodiment.

This embodiment could also be operated with controlled auto-ignition at light loads (e.g., less than 30% of maximum load) and control of oxygen concentration to stoichiometric for higher loads to allow for effectiveness of a three-way, NO reducing catalyst 51. This engine configuration would require greater attention to controlling $T_1$ to control $T_2$, but the reduced boost levels allowed (but higher $T_3$ and NO formation) with exhaust catalytic reduction of NO, would reduce the cost of the engine.

Third Embodiment

A third embodiment of the invention also provides diesel-like efficiency, but in an engine which utilizes a pre-mixed charge of very high octane fuel (research octane rating >90 or more, preferably >100) such as methanol or ethanol and certain gasolines, with spark or similar controlled ignition means. The method of operation of the present invention is utilized to control the compression temperature $T_2$ and oxygen concentration in the charge-air to avoid autoignition, and thus allows the ignition source to ignite the charge-air fuel mixture at an optimum time to achieve high efficiency in a high compression engine. The compression ratio will preferably be 15:1 to 20:1 and more preferably about 19:1 or more. In the case of such engines, all engine features are as previously described with reference to FIG. 2, except that item 23 becomes spark plug 23". As in the previously described embodiments $T_2$ is controlled by control of $T_1$ and boost pressure.

Spark timing in the third embodiment is preferably about 30° BTDC to near TDC to produce peak cylinder pressure from immediately after TDC to about 15° after TDC.

This third embodiment, like the first and second embodiments, controls the location of peak cylinder pressure, individually for each cylinder, to within a range of from immediately after TDC to near fifteen degrees after TDC.

Other embodiments which operate with controlled $T_2$ at a level just prior to auto-ignition and which utilize a controlled ignition source (e.g., spark plug or glow plug) to initiate combustion, and embodiments which utilize combination operating strategies of controlled autoignition and assisted ignition (where the direct fuel injectors 23 of FIG. 2 would be replaced with the ignition source) should be obvious to one skilled in the related art.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A method of operating an internal combustion engine comprising:

intaking ambient air through at least one compressor to provide a charge-air at a boosted pressure and introducing the charge-air to the internal combustion engine;

introducing fuel into the internal combustion engine for combustion in admixture with the charge-air at a combustion temperature approximating a target combustion temperature, and producing an exhaust gas;

sensing engine operating conditions inclusive of torque demand; and changing the boosted pressure proportional to a change in the sensed torque demand so as to maintain the combustion temperature at approximately the target combustion temperature, said target combustion temperature being below 2100° K.

2. The method of claim 1 further comprising:

passing a first portion of the charge-air through a heat exchanger for heat exchange and by-passing a second portion of the charge-air through a by-pass line around said heat exchanger;

sensing intake temperature of the charge-air downstream of the by-pass line and the heat exchanger;

controlling the amount of said second portion of the change air by-passing the heat exchanger by operation of a control valve in the by-pass line to bring the sensed intake temperature to approximately a target charge-air temperature.

3. The method of claim 2 further comprising:

recirculating a portion of the exhaust gas for admixture with said charge-air and fuel;

determining oxygen concentration in the admixture; and regulating the portion of exhaust gas recirculated to bring the determined oxygen concentration to a target oxygen concentration determined for the engine operating conditions.

4. The method of claim 3 further comprising:

sensing the boosted pressure;

controlling rate of fuel introduction into the internal combustion engine responsive to the sensed charge-air intake temperature and the sensed boosted pressure.

5. The method of claim 3 wherein the compression ratio is 15:1 to 20:1, wherein the fuel has an octane rating of 90 or more, wherein the location of the combustion event is controlled by spark timing and wherein auto-ignition is prevented by control of boost pressure, oxygen concentration in the charge-air and charge-air temperature.

6. The method of claim 1 further comprising:

recirculating a portion of the exhaust gas for admixture with said charge-air and fuel;

sensing oxygen concentration in the admixture; and regulating the portion of exhaust gas recirculated to bring the sensed oxygen concentration to a target oxygen concentration determined for the engine operating conditions.

7. The method of claim 1 further comprising:

sensing the boosted pressure;

controlling rate of fuel introduction into the internal combustion engine responsive to the sensed charge-air intake temperature and the sensed boosted pressure.

8. The method of claim 1 wherein said fuel is introduced into the ambient air either upstream or downstream of the at least one compressor so that the fuel is contained within the charge-air.

9. The method of claim 1 further comprising:

circulating engine coolant at a flow rate F and in a heat exchange relationship with engine surfaces contacting the charge-air; and controlling the flow rate F responsive to changes in the engine speed and load.

10. The method of claim 9 further comprising:

circulating the engine coolant through a radiator; and controlling cooling of the engine coolant in passage through the radiator responsive to changes in the engine speed and load.

11. The method of claim 1 further comprising:

circulating engine coolant in a heat exchange relationship with engine surfaces contacting the charge-air and through a radiator; and controlling cooling of the engine coolant in passage through the radiator responsive to changes in the engine speed and load.

12. The method of claim 1 wherein the fuel is diesel fuel and wherein auto-ignition occurs when the fuel is introduced into a cylinder of the internal combustion engine.

13. The method of claim 1 wherein the internal combustion engine is operated with a compression ratio of at least 12:1 and wherein the fuel is gasoline, and further comprising:

recirculating a portion of the exhaust gas for admixture with the charge-air and fuel;

determining peak cylinder pressure;

determining oxygen concentration in the admixture; and regulating the portion of exhaust gas recirculated to produce auto-ignition and the peak cylinder pressure within a predetermined location in a combustion cycle.

14. The method of claim 13 wherein said predetermined location in the combustion cycle is within a range of from immediately after TDC to near fifteen degrees after TDC.

15. A method of operating an internal combustion engine comprising:

intaking ambient air through at least one compressor to provide a charge-air at a boosted pressure and introducing the boosted charge-air to the internal combustion engine;

introducing fuel into the internal combustion engine for combustion in admixture with the charge-air, producing an exhaust gas;

sensing torque demand; and changing the boosted pressure proportional to a change in the sensed torque demand so as to maintain an approximately constant ratio $Hc/c_v M$ wherein Hc is the heat of combustion, $c_v$ is the specific heat capacity of the admixture of charge-air, and M is the mass of the charge-air.

16. A method of operating an internal combustion engine comprising:

intaking ambient air to provide a charge-air and introducing the charge-air to the internal combustion engine;

introducing fuel into the internal combustion engine for combustion in admixture with the charge-air at a combustion temperature approximating a target combustion temperature, and producing an exhaust gas;

passing a first portion of the charge-air through a heat exchanger for heat exchange and by-passing a second portion of the charge-air through a by-pass line around said heat exchanger;

sensing intake temperature of the charge-air downstream of the by-pass line and the heat exchanger;

determining oxygen concentration in the admixture;

sensing engine operating conditions inclusive of torque demand, crank angle and combustion pressure; and determining a target crank angle for peak combustion pressure at the sensed torque demand;

bringing the sensed crank angle, into conformance with the target crank angle by controlling the amount of said second portion by-passing the heat exchanger by operation of a control valve in the by-pass line to adjust the sensed intake temperature and/or by regulating the portion of exhaust recirculated.

17. The method of claim 16 further comprising:

compressing the charge-air to provide charge-air at a boosted pressure;

sensing the boosted pressure; and controlling rate of fuel introduction into the internal combustion engine responsive to the sensed charge-air intake temperature and the sensed boosted pressure.

18. The method of claim 16 further comprising:

passing a first portion of the charge-air through a heat exchanger for heat exchange and by-passing a second portion of the charge-air through a by-pass line around said heat exchanger;

sensing intake temperature of the charge-air downstream of the by-pass line and the heat exchanger;

controlling the amount of said second portion by-passing the heat exchanger by operation of a control valve in the by-pass line to bring the sensed intake temperature to approximately a target charge-air temperature.

19. The method of claim 16 further comprising:

circulating engine coolant in a heat exchanger relationship with engine surfaces contacting the charge-air and through a radiator; and controlling cooling of the engine coolant in passage through the radiator responsive to changes in the engine speed and load.

20. The method of claim 16 further comprising:

recirculating a portion of the exhaust gas for admixture with said charge-air and fuel.

21. A method of operating an internal combustion engine comprising:

introducing a gasoline fuel and charge-air into the internal combustion engine for combustion with a compression ratio of at least 12:1, at a combustion temperature approximating a target combustion temperature, and producing an exhaust gas;

recirculating a portion of the exhaust gas for admixture with the charge-air and fuel;

determining peak cylinder pressure;

determining oxygen concentration in the admixture; and regulating the portion of exhaust gas recirculated to produce auto-ignition and the peak cylinder pressure within a predetermined location in a combustion cycle.

22. The method of claim 21 further comprising:

passing a first portion of the charge-air through a heat exchanger for heat exchange and by-passing a second portion of the charge-air through a by-pass line around said heat exchanger;

sensing intake temperature of the charge-air downstream of the by-pass line and the heat exchanger;

controlling the amount of said second portion by-passing the heat exchanger by operation of a control valve in the by-pass line to bring the sensed intake temperature to approximately a target charge-air temperature.

23. The method of claim 22 further comprising:

circulating engine coolant in a heat exchange relationship with engine surfaces contacting the charge-air and through a radiator; and controlling cooling of the engine coolant in passage through the radiator to assist in regulating the auto-ignition and peak cylinder pressure to within said predetermined location.

24. The method of claim 23 wherein said predetermined location in the combustion cycle is within a range of from immediately after TDC to near fifteen degrees after TDC.

25. The method of claim 21 wherein said predetermined location in the combustion cycle is within a range of from immediately after TDC to near fifteen degrees after TDC.

26. A method of operating an internal combustion engine comprising:

introducing a fuel having an octane rating of at least 90 and charge-air into the internal combustion engine for combustion in admixture with a compression ratio of 15:1, to 20:1 at a target combustion temperature predetermined to minimize $NO_x$ formation, and producing an exhaust gas;

recirculating a portion of the exhaust gas for admixture with the charge-air and fuel;

determining peak cylinder pressure;

determining oxygen concentration in the admixture;

igniting the admixture, at a predetermined timing, with a spark from a spark device; and regulating that portion of exhaust gas recirculated to regulate the final compression temperature and to avoid auto-ignition.

27. The method of claim 26 further comprising:

passing a first portion of the charge-air through a heat exchanger for heat exchange and by-passing a second portion of the charge-air through a by-pass line around said heat exchanger;

sensing intake temperature of the charge-air downstream of the by-pass line and the heat exchanger;

controlling the amount of said second portion by-passing the heat exchanger by operation of a control valve in the by-pass line to bring the sensed intake temperature to approximately a target charge-air temperature.

28. The method of claim 27 further comprising:

circulating engine coolant in a heat exchange relationship with engine surfaces contacting the charge-air and through a radiator; and controlling cooling of the engine coolant to assist in control of the final compression temperature.

* * * * *